Oct. 31, 1950 E. O. WILLOUGHBY 2,527,608

CONSTANT IMPEDANCE NETWORK

Filed March 23, 1945 2 Sheets-Sheet 1

Inventor
ERIC OSBORNE WILLOUGHBY
By [signature]
Attorney

Oct. 31, 1950 E. O. WILLOUGHBY 2,527,608

CONSTANT IMPEDANCE NETWORK

Filed March 23, 1945 2 Sheets-Sheet 2

Inventor

ERIC OSBORNE WILLOUGHBY

By [signature]

Attorney

Patented Oct. 31, 1950

2,527,608

UNITED STATES PATENT OFFICE 2,527,608

CONSTANT IMPEDANCE NETWORK

Eric Osborne Willoughby, London, England, assignor, by mesne assignments, to International Standard Electric Corporation, New York, N. Y., a corporation of New York Application March 23, 1945, Serial No. 584,470
In Great Britain April 21, 1944

4 Claims. (Cl. 178—44)

The present invention relates to four terminal impedance networks of the type constituted by one or a plurality of series connected cells each cell consisting in series and shunt impedances, for example series inductance and shunt capacity or series capacity and shunt inductance. In the former case the network may function, for example as a low pass filter or artificial line or a delay network and in the latter case the network may function, for example as a high pass filter.

In using such network as a filter or delay network, for example, it may be necessary to vary the inductance and capacity of the series and shunt arms to adjust the filter to the desired cut-off frequency or to adjust the time constant of the delay network whilst at the same time varying the characteristic impedance of the network according to a specified law. It is the object of this invention to provide a physical form of network in which the inductances and capacities may be varied to adjust the network to specified cut-off frequencies or phase delay wilst varying the characteristic impedance according to a specified law and particularly maintaining in a low or high pass filter, or delay network, the characteristic impedance of the network constant over a wide range of cut-off frequencies to which the network may be adjusted.

It will be well known to those skilled in the art that the characteristic impedance of a network of the type specified depends upon the ratio L/C and the cut-off frequency of a low or high pass filter depends upon I/LC where L is the inductance of one arm of a cell and C the capacity of the other arm.

According to a broad aspect of the invention a four terminal impedance network of the kind hereinbefore specified includes a member which is comprised in the capacity and the inductance and means for varying the position of said member to vary the ratio of inductance to capacity in any desired manner including zero variation.

According to a more specific aspect of the invention a four terminal impedance network of the type hereinbefore specified is characterized in this that each cell comprises a first conducting surface and a unit comprising a series connected inductance coil and a second conducting surface, said first conducting surface cooperating with said second conducting surface to form a capacity and also influencing the value of the self-inductance of the said coil and means for moving said first conducting surface and said unit relatively to each other in such a way that the ratio of inductance to capacity varies in any desired manner including zero variation.

In carrying the invention into practice according to a preferred embodiment the said first conducting surface is of tubular form and is arranged to form a closed circuit about the inductance coil so that as this latter is moved axially in the tube the inductance of the coil is varied. A second conducting surface which forms part of a tube of different cross-sectional dimensions than the first conducting surface is connected in series with the coil and co-operates with the first conducting surface to form a condenser. The coil and second surface are adapted to move axially together so that as more of the second surface is withdrawn from the first conducting surface, and the capacity decreases, more of the coil is brought under the influence of the first conducting surface and the inductance is decreased. The coil and surfaces may be so designed that the inductance and capacity may be reduced in the same ratio thus maintaining the ratio of inductance to capacity substantially constant, thereby retaining the characteristic impedance of the network substantially constant whilst varying the product LC which determines the cut-off frequency of a high or low pass filter.

Whilst the preferred method of carrying the invention into practice is applicable to high pass filters that is comprising series capacities and shunt arm inductances, it is more practical when applied to low pass filters, namely series inductances and shunt arm capacities.

The invention will be further explained with reference to the accompanying drawings which show the preferred physical embodiment of the invention in low and high pass filters particularly for use at ultra high frequencies. In this preferred embodiment the low pass filter comprises a hollow cylindrical member and a coaxial internal rod-like member. In the drawings.

Figures 1, 2, 3, 4, 5:
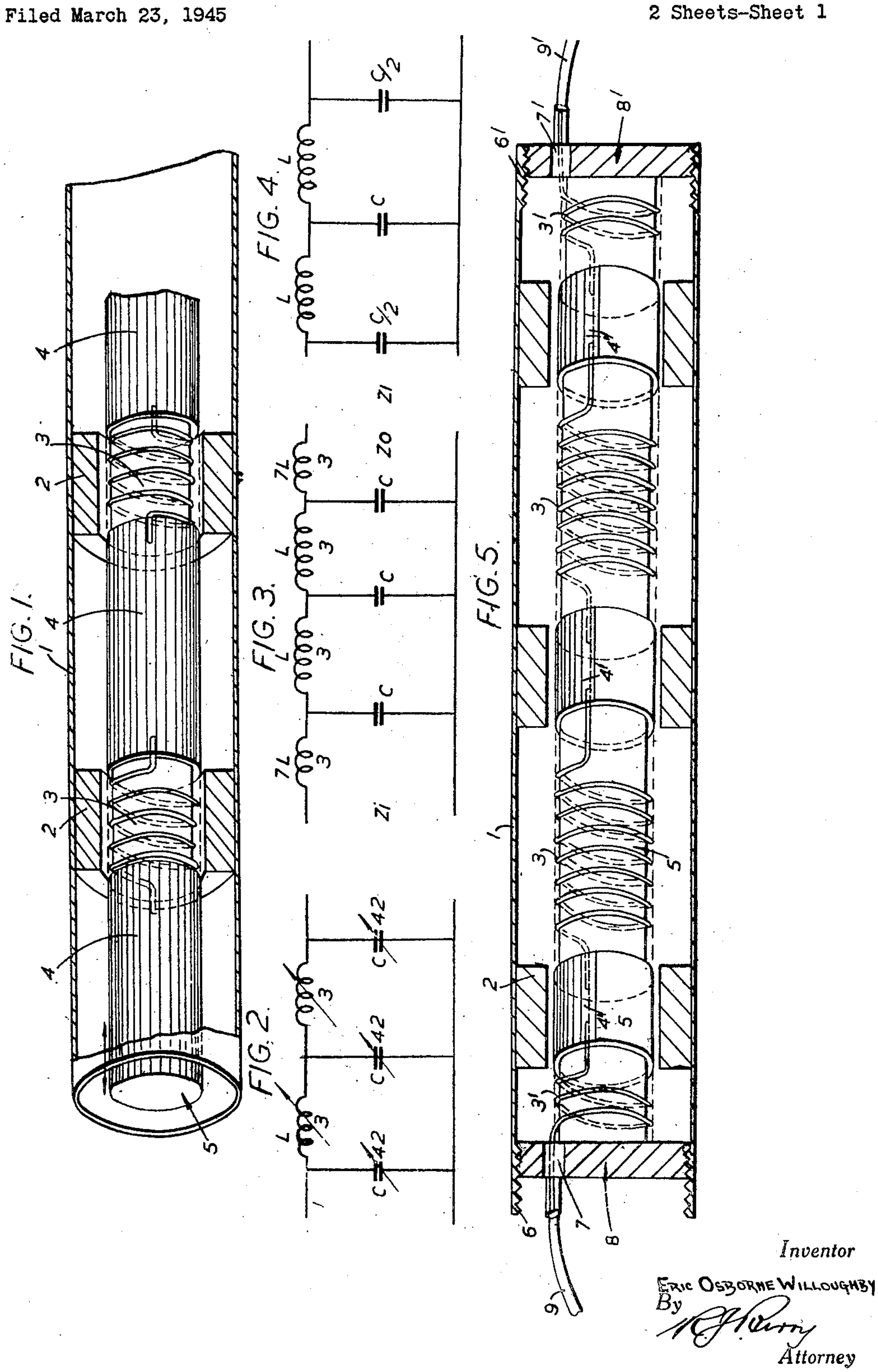
Fig. 1 is a perspective side view showing a portion of the hollow cylindrical member cut away in order to show the members in the interior.
Figs. 2, 3 and 4 are schematic representations used in the description of the low pass filter.
Fig. 5 is a view showing the outer hollow cylindrical member in longitudinal section and the inner rod-like member in perspective.

Referring to Figs. 1-5 of the drawings, the low pass filter comprises inductances in the series arm and capacities in the shunt arms, as shown in Fig. 2. In the construction illustrated in Fig. 1 the capacities are formed between the inner cylindrical surfaces of members 2 and co-operating conducting cylindrical surfaces 4, and the inductances are formed by helically wound coils 3 connected in series with the conducting surfaces 4. The coils 3 and surfaces 4 are mounted on a rod 5 of insulating material, e. g., ebonite. The surfaces 4 may be complete cylinders and may be formed by sheet metal or any other convenient manner, or they may be only part of the cylindrical surface as shown in Fig. 5. The members 2 are spaced apart longitudinally at distances equal to the spacing between the surfaces 4 and are secured in position by mounting them on a cylinder 1 of conducting material, which forms the outer earth screen of the unit.

In Fig. 1, the members 2 are shown as surrounding the coils 3, so that in this position the inductance of coils 3 is a minimum and also the capacity between the inner cylindrical surface of 2 and the cylindrical surface 4 is a minimum. It will be observed that the member 2 forms a closely coupled short circuited turn surrounding the coil 3 and thus influences the inductance of this latter. As the inner rod is moved axially relatively to the tubular member 1 the coil 3 moves from under and away from the short circuited turn 2 and its inductance increases due to the reduction of coupling between 2 and 3 and at the same time the surface 4 moves under the surface of 2 and the capacity between the two surfaces increases. Thus the arrangement will operate as an adjustable low pass filter of the type shown in Fig. 2.

By dimensioning the relative areas of 2 and 4 and the pitch of the coil 3 it is possible to vary L and C in such manner that the ratio of L/C varies according to any desired law. In particular the most useful case in practice will normally be when the ratio of L/C remains constant, thus providing a substantially constant characteristic impedance over a wide range of values of L and C, and hence covering a wide range of cut-off frequencies determined by the product of L.C.

The input and output of the filter may be arranged as shown in Figures 3 and 4 in accordance with well known practice. That is, the terminals may be arranged at the centre of a series arm as shown in Figure 3 or across the shunt arm capacity as shown in Figure 4. Thus in the case of Figure 3, the first and last inductance coils 3 have only one-half the inductance, i. e., ½ (=.7071) the number of turns as the coils 3 of the intermediate cells if the coils are short compared to the operating wave length or equal to it and likewise in the case of Figure 4 the two end capacities have only one-half the value of each of the other shunt capacities.

Figure 5 shows a typical assembly of a low pass filter having an input and output of the kind shown in Figure 3. The construction is similar to that shown in Figure 1 except that the surfaces 4' are not complete circular cylinders. In order to provide the relative movement between the outer tube 1 and the unit 3'—4' on insulating rod 5, for example, of ebonite, the tube 1 is moved around the rod 5 by means of the internally threaded members 6, 6' at respective ends of the tube 1 and the externally threaded members or nuts 8, 8' secured to the respective ends of the rod 5 and which co-operate with members 6, 6'.

The coaxial transmission lines 9, 9' which feed power to the network and take power from the network are plugged into concentric plugs 7, 7' which terminate the end half-coils of the network, and are secured in the members 8, 8' respectively.

It will be observed that by adjusting the pitch of the coils 3 the law of variation of inductance with axial relative movement between 2 and 3, may be obtained. Furthermore, the surfaces 4 may be made of non-uniform axial dimensions and/or the pitch of the coil may vary along the length of the coil in order to obtain any desired law of frequency change with angular rotation of the outer casing 1 or with variation in characteristic impedance. Instead of varying the pitch of the coil the diameter of the coil may be varied along its length, to obtain any desired law of inductance variation. Whilst complicated calculations may be made to determine the requisite dimensions, these may be found more conveniently in practice by trial.

When the network is used at very high frequencies the coils 3 may be replaced by narrow strips of straight metal foil connecting the surfaces 4. The width of the strips of foil adjusts the effective inductance and they may be of rectangular form or have curved sides. Then the coils 3 and conducting surfaces 4 together with the outer conducting tube 1 become short lengths of transmission line 3—1 and 4—1 of high and low characteristic impedance respectively which is adjustable over the portions of the lines that can be overlapped by the members 2, the whole giving precisely the same effect as the coil and condenser at the longer wave lengths.

Figure 6:
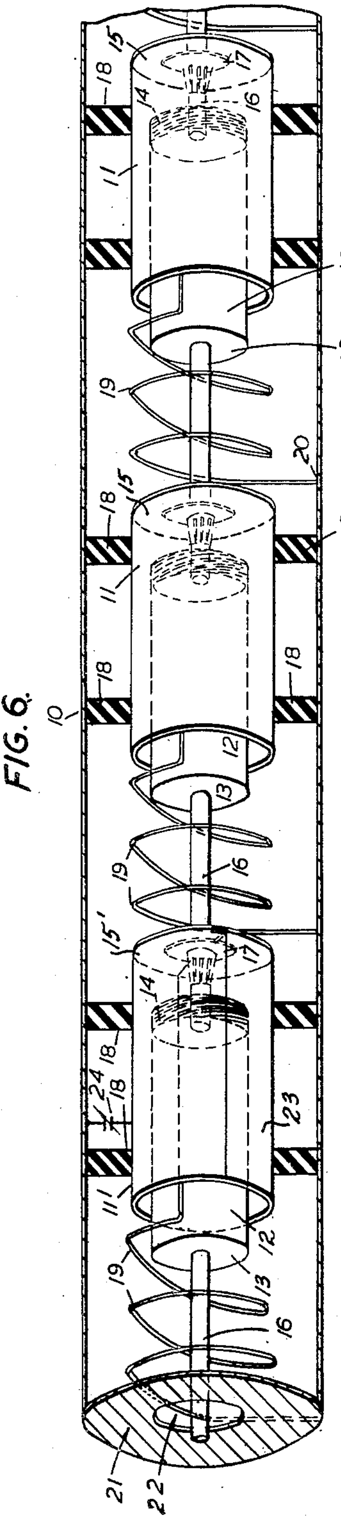
Fig. 6 is a view partly in section and partly in perspective of a high pass filter constructional form and Fig. 7 is the circuit diagram of the form shown in Fig. 6.
Figure 7:
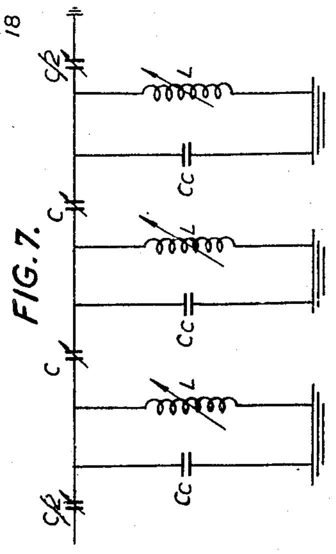
Figure 1A:
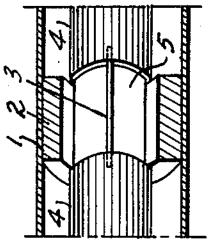
Fig. 1A is a perspective view partly in section showing a modified form of the arrangement of Fig. 1.

The high pass filter does not lead itself to such a simple construction as the low pass filter. Figure 6 shows a constructional form of several cells the circuit diagrams of which are shown in Figure 7.

Referring firstly to Figure 6 which is shown partially in section and partially in perspective, 10 is an outer earthed cylindrical hollow conductor, and 11 and 12 are two hollow conducting cylinders, coaxial with each other and with the cylinder 10. Cylinder 12 is of smaller diameter than cylinder 11 and is arranged to move axially within the latter. The left hand end of 12 is closed by a conducting disc 13 and the right hand end is closed by an insulating member 14 the purpose of which is to support a shaft as will be seen hereinafter. The left hand end of cylinder 11 is open but the right hand end is closed by the conductor disc 15, which is provided with a central aperture fitted with a wiper contact 17. The end conducting disc 13 of the inner cylinder 12 is secured to a conducting shaft 16 which on assembly of the cells passes through the wiper 17 and is secured at its end in the insulating member 14. It will thus be seen that the inner members 12 are secured together and can move longitudinally together, the shafts 16 sliding in the wipers 17.

The conducting cylinders 11 are secured in the outer conducting cylinder 10 by means of insulating rings 18 or in any other convenient manner. The inductances comprise helical coils 19 secured at one end 20 to the outer earthed cylinder 10 and at the other end to the cylinder 11.

When for use with very high frequencies, the coils may be made from tubular conductors which will not require any support, and the coils are preferably of the same diameter as the cylinders 11. The coils 19 may, if necessary be supported on hollow cylindrical insulators which fit into and are supported by cylinders 11.

Considering now the circuit diagram shown in Figure 7 it will be seen that the inductance L represents the inductance of coil 19 connected between the outer earthed cylinder 10 and one plate 11 of the capacity formed between members 11 and 12, Figure 6, represented by capacity C, Figure 7. The capacity Cc shown across the inductance L is formed between the cylinder 11 and the earthed cylinder 10 and connected between one end of the coil 19 and earthed cylinder 10.

When the central unit comprising cylinders 12 is moved axially with respect to the cylinders 11, the capacity between 12 and 11 is varied and also the inductance of coil 19 since, with regard to this latter, the cylinder 12 functions as a closed circuit. The axial relative movement may be obtained in any convenient manner, for example as in the case of the low pass filters of Figs. 1–5.

The input and output of the high pass filter may as in known practice be arranged as in the case of the low pass filter. That is, the terminals may be arranged at the centre of a series arm as shown in Figure 6 or across the shunt arm inductance. Considering the end cell on the left hand side of Figure 6 one terminal is on the earthed cylinder 10 which may be closed by a conducting disc 21 having a central aperture 22 through which protrudes the shaft 16 connected to the inner cylinder 12 and which forms the other terminal. It will be noted that the surface of the member 11′ of the first cell is only one-half that of the intermediate cells, since only one-half the capacity is required in the first cell for the series arm input or output connection and this half cylinder may be supported on an insulating cylindrical member 23. The member 11′ is most suitably provided with a half circular end disc 15′ instead of a complete disc as in the intermediate cells. Owing to the fact that 11′ is only half the size of surfaces 11, the capacity between 11′ and 10 is less than the capacity Cc between 11 and 10 and therefore an additional capacity 24 which is adjustable is provided between 11′ and 10 as shown and may be of any well known construction.

When the terminals are at the ends of a shunt arm, the shunt arm impedance of the end cell must be twice the shunt arm impedance of the intermediate cells. This may be effected by doubling the inductance of the coil 19 of the end cell, and halving the capacity between the complete cylinder 11 of the end cell and cylinder 10. For assembly purposes, each cell may be constructed as a separate unit with sections of the outer tube 10 adapted to screw on to each other end to end. The shafts 16 of the adjacent cells are then connected by the wipers 17. Alternatively the tube 10 may be provided continuous in one-piece with a longitudinal slot in which the ends of coils 19 may make electrical contact with the tube. The inner members 12, 11, 19, 18, 16 may then be assembled before locating in the outer tube 10.

As in the case of the low pass filter, variations may be made in the high pass filter by varying the pitch of coil 19 or the diameter thereof along its length and also the surfaces 11 and 12 may be given non-uniform axial dimensions.

It is found in practice that in using helical coils 3 or 19 and parallel sided conducting surfaces 4 practically constant output is obtained over quite a wide frequency range.

What is claimed is:

1. An impedance network of the type constituted by a plurality of electrically connected cells each cell comprising a plurality of longitudinally spaced coaxial hollow conducting cylinders and helical coil inductances alternating with said conducting cylinders, and having one end connected to earth potential and the other end to the adjacent one of said conducting cylinders, and smaller diameter conducting cylinders coaxial with the coils and the larger diameter conducting cylinders and arranged to form capacities with these latter and means for connecting said capacities in series, said smaller cylinders also being arranged to move together relatively to said larger cylinders and to the helical coils so as to vary said capacities and influence the inductances of said coils in such manner that the ratio of inductance to capacity varies in a desired manner, including zero variation.

2. An impedance network as claimed in claim 1 wherein the larger conducting cylinders are closed at one end by a conductor disc having a central aperture and a wiper contact and the smaller conducting cylinders are closed at the ends opposite the closed ends of the larger cylinders by conducting discs each carrying a shaft and at their other ends by insulation discs, the shaft of each cell passing through the aperture and wiper contact of the preceding cell and secured in said insulation disc of the smaller conducting cylinder of said preceding cell.

3. An impedance network as claimed in claim 1 wherein said larger diameter conducting cylinder and inductance coils are enclosed within a hollow earthed conducting cylinder.

4. An impedance network as claimed in claim 1 wherein the turn pitch of the helical coil is so adjusted that with relative axial movement between said larger and small conducting cylinders the characteristic impedance of the network remains constant over a wide frequency band.

ERIC OSBORNE WILLOUGHBY.

REFERENCES CITED

The following references are of record in the file of this patent:

UNITED STATES PATENTS

| Number | Name | Date |
|---|---|---|
| 2,147,425 | Bock | Feb. 14, 1939 |
| 2,227,846 | Rust | Jan. 7, 1941 |
| 2,341,345 | Van Billiard | Feb. 8, 1944 |